June 1, 1937.  H. J. SAUER  2,082,659
COLLISIONPROOF CLEARANCE LAMP FOR VEHICLES
Filed May 9, 1936
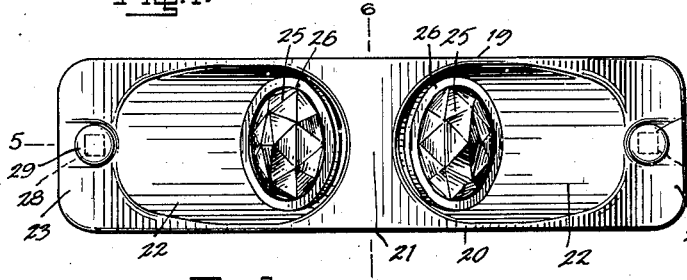
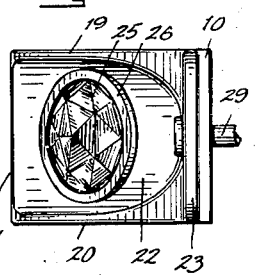
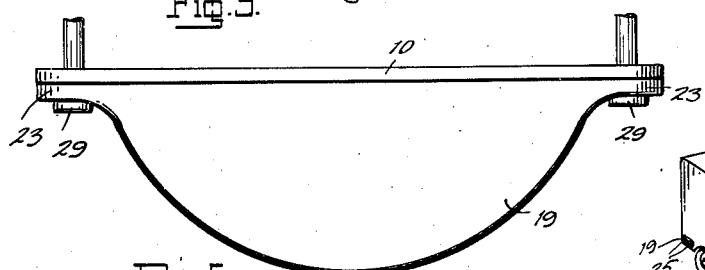
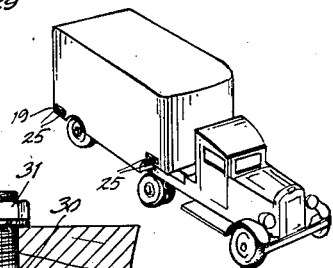
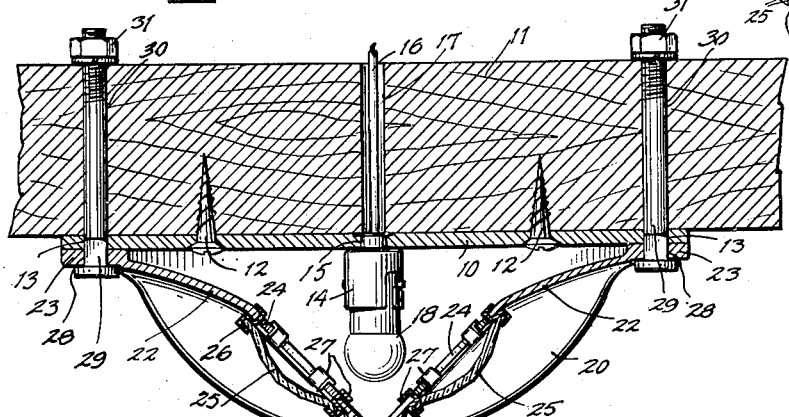
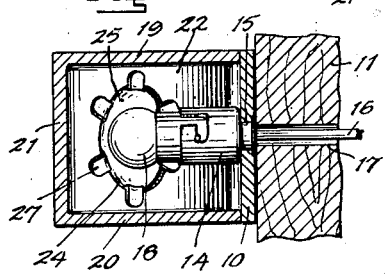
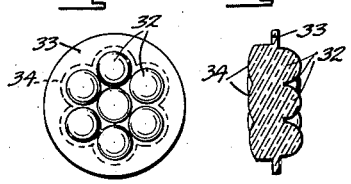
INVENTOR
HENRY J. SAUER.
BY
ATTORNEY Patented June 1, 1937

2,082,659

UNITED STATES PATENT OFFICE 2,082,659

COLLISIONPROOF CLEARANCE LAMP FOR VEHICLES

Henry J. Sauer, Fairfield, Conn., assignor to The Kilborn-Sauer Company, Fairfield, Conn., a corporation of Connecticut Application May 9, 1936, Serial No. 78,791

3 Claims. (Cl. 240—8.2)

The present invention relates to a collisionproof clearance lamp for vehicles, particularly intended for use upon trucks, busses, trailers and the like, and adapted to be mounted upon the sides of such vehicles. The arrangement of the clearance lamps upon the sides of such vehicles is such that they are unprotected against sideswiping and it is an object of the invention therefore to provide a lamp of such sturdy construction and form as to withstand collisions due to side swiping or other causes. It is a further object to provide a lamp in which the lamp bulb and the lens will be completely protected against collision and which will provide clear illumination throughout a complete range of 180°, so that the clearance lights will be visible while approaching and passing the vehicle.

A further object is to provide an improved mounting means whereby the base portion of the lamp may be permanently mounted upon the vehicle, while the casing portion is detachably mounted so that access may be readily had to the interior of the lamp. Another object is to provide fastening means for the lamp which will only permit it to be removed by manipulation from the inside of the vehicle, so that theft of the lamp is prevented.

With the above and other objects in view, an embodiment of the invention is shown in the accompanying drawing, and this embodiment will be hereinafter more fully described with reference thereto, and the invention will be finally pointed out in the claims.

In the drawing:

Fig. 1 is a front elevation of a clearance lamp according to my invention.

Fig. 2 is an end elevation.

Fig. 3 is a top plan view.

Fig. 4 is a perspective view of a trailer truck equipped with clearance lamps according to my invention.

Fig. 5 is a horizontal sectional view along the line 5—5 of Fig. 1, and showing a portion of the frame work of the vehicle to which the lamp is secured.

Fig. 6 is a vertical sectional view taken along the line 6—6 of Fig. 1.

Fig. 7 is a front view of a modified form of autocollimating lens adapted to be used in the lamp.

Fig. 8 is a sectional view thereof.

Similar reference characters indicate corresponding parts throughout the several figures of the drawing.

Referring to the drawing, the clearance lamp according to the illustrated exemplary embodiment of the invention comprises a base plate member 10 adapted to be secured to the frame 11 of the vehicle by screws 12—12 normally concealed within the casing member, apertures 13—13 being provided adjacent the ends of the base plate for receiving the attaching bolts of the casing member. The lamp socket 14 is secured in a hole 15 provided centrally in the plate, the lead wire 16 which projects rearwardly from the socket being adapted to extend through a passage 17 in the frame 11 to a source of electrical energy. A lamp bulb 18 is removably engaged in the socket.

The casing member, which is preferably formed of malleable iron, comprises upper and lower walls 19 and 20, the projecting edges of which are of arcuate form, and a vertical wall connecting the upper and lower walls and consisting of a central partitioning post portion 21, the forward surface of which is flush with the arcuate edges of the upper and lower walls and recessed wall portions 22—22 extending at each side of the post portion 21 to the ends of the casing where they terminate in outwardly projecting ear portions 23—23. The portions of the walls 22—22 immediately adjacent the central post portion are disposed in flat planes at an angle of 90° to each other and each provided with a circular lens opening 24. A lens 25 is mounted over each of the openings 24 by means of a lens mounting frame 26 engaged about the periphery of the lens and provided with inwardly projecting prongs 27 engaged in the opening and bent over upon the inner side of the casing.

The attaching ears 23—23 are provided with square holes 28—28 through which the attaching bolts 29—29 are engaged. These bolts extend through the holes 13—13 in the base plate 10 and through holes 30—30 in the frame 11, being secured at the inner side of the frame by nuts 31—31 screwed upon the threaded ends of the bolts. This arrangement prevents unauthorized removal of the lamp, but permits the casing to be readily removed by a person having access to the inside of the vehicle when it is desired to renew the lamp bulb.

In Figs. 7 and 8 I have illustrated a modified form of autocollimating lens that may be employed in the lamp if desired and which consists of a plurality of semi-spherical objective lens portions 32—32 integrally formed upon the face of the circular lens body 33 and a plurality of convex reflecting surfaces 34 integrally formed upon the rearward side of the lens body in individual alignment with the respective objective lens portions 32. This lens will be normally illuminated by the lamp bulb within the casing, and will also be illuminated by outside sources such as the lamps on other vehicles.

The arrangement of the lenses within the recessed wall of the casing is such that they are completely protected against collision, while the form of the casing is such as not only to withstand hard blows but to ward off any bodies colliding with the vehicle so that damage to the vehicle is minimized. As is clear from Figs. 1 and 2 the lenses are visible from the side as well as from the end of the vehicle, and are also constantly visible through 180°.

I have illustrated and described a preferred and satisfactory embodiment of the invention, but it will be obvious that changes may be made therein, within the spirit and scope thereof, as defined in the appended claims.

Having thus described my invention what I claim and desire to secure by Letters Patent is:—

1. A clearance lamp for vehicles, comprising a lamp bulb socket mounting member, a lamp bulb socket mounted on said member, a casing member secured to said socket mounting member to enclose said lamp bulb socket and comprising upper and lower walls, the front edges of which are arcuate in outline, and a front wall having a central portion and recesses at each side of said central portion, said recesses each having a lens aperture and a lens for said aperture, said lens apertures being disposed at each side of said lamp bulb socket and disposed in planes each at an angle to the longitudinal and transverse axes of said casing member whereby said lenses are visible along said axes.

2. A clearance lamp for vehicles, comprising a flat base member adapted to be secured to a surface of the vehicle, a lamp bulb socket mounted on said base member, a casing member secured to said base member to enclose said lamp bulb socket and comprising upper and lower walls, the rear edges of which are parallel to and engage said base plate and the front edges of which are arcuate in outline, and a front wall having a central portion and recesses at each side of said central portion, said recesses each having a lens aperture and a lens for said aperture, said lens apertures being disposed at each side of said lamp bulb socket and disposed in planes at an angle to the longitudinal and transverse axes of said casing member whereby said lenses are visible along said axes.

3. A clearance lamp for vehicles, comprising a base member adapted to be mounted upon a surface of the vehicle, securing means arranged to secure said base member to said vehicle, a lamp bulb socket mounted on said base member, a casing member secured to said base member to enclose said lamp bulb socket and said securing means and comprising upper and lower walls and a front wall having recesses at each side of the center, said recesses each having a lens aperture and a lens for said aperture, and securing means arranged to secure said casing member to said vehicle independently of said first mentioned securing means.

HENRY J. SAUER.